June 2, 1925.  
E. R. CALTHROP  
1,540,312  
METHOD OF ERECTING REENFORCED CONCRETE STRUCTURES  
Filed May 9, 1923  
9 Sheets-Sheet 1
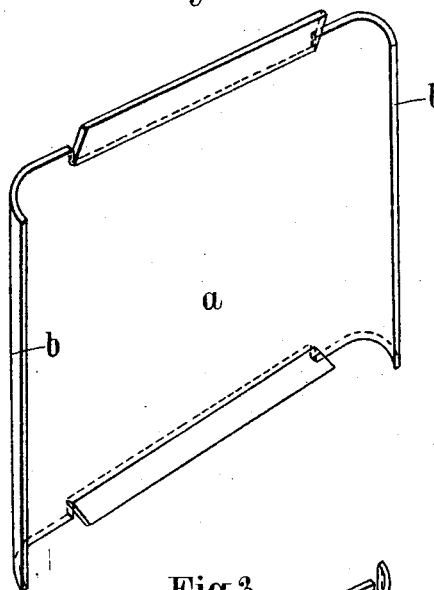
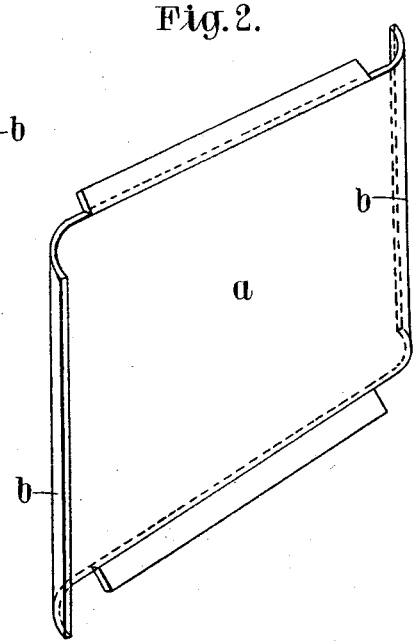
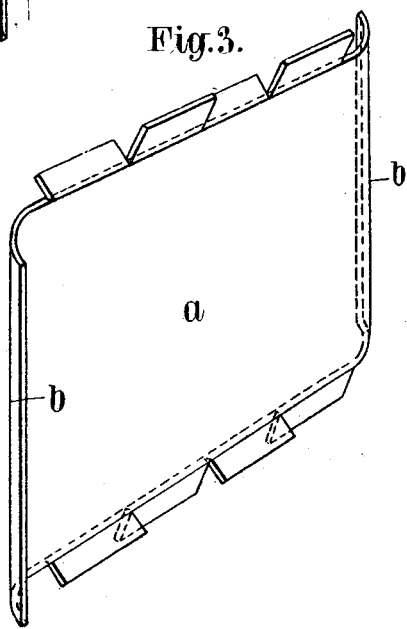
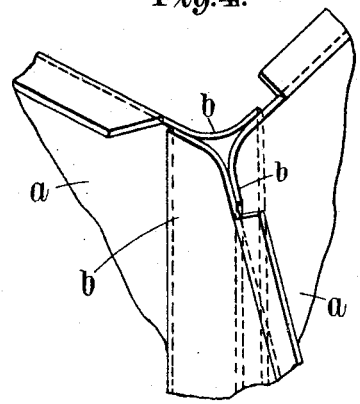
INVENTOR  
E. R. Calthrop  
by Langner, Perry, Card + Langner  
Attys.

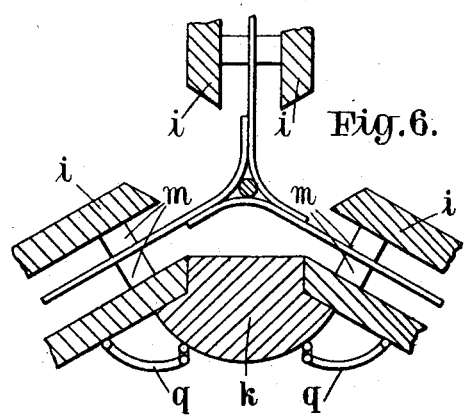

June 2, 1925.

E. R. CALTHROP 1,540,312

METHOD OF ERECTING REENFORCED CONCRETE STRUCTURES

Filed May 9, 1923

INVENTOR
E.R.Calthrop

June 2, 1925. 1,540,312
E. R. CALTHROP
METHOD OF ERECTING REENFORCED CONCRETE STRUCTURES
Filed May 9, 1923 9 Sheets-Sheet 5

INVENTOR
E.R.Calthrop
by Langner, Parry, Card + Langner
Attys.

June 2, 1925.  1,540,312
E. R. CALTHROP
METHOD OF ERECTING REENFORCED CONCRETE STRUCTURES
Filed May 9, 1923  9 Sheets-Sheet 6

INVENTOR
E. R. Calthrop
by Langner, Parry, Card & Langner
Attys.

Patented June 2, 1925.

1,540,312

UNITED STATES PATENT OFFICE.

EVERARD RICHARD CALTHROP, OF LONDON, ENGLAND.

METHOD OF ERECTING REENFORCED CONCRETE STRUCTURES.

Application filed May 9, 1923. Serial No. 637,866.

*To all whom it may concern:*

Be it known that I, EVERARD RICHARD CALTHROP, subject of the King of Great Britain, residing at London, England, have invented new and useful Improvements Relating to Methods of Erecting Reenforced Concrete Structures, of which the following is a specification.

This invention has reference to reenforced concrete structures and more particularly to such as are composed of a plurality of polyangular cells such as may be used in the construction of seawalls, harbours, quays, floating forts, floatable cold storage chambers, concrete ships and other erections or for the construction of floatable submergible or other subaqueous structures generally and for cellular oil or water tanks, docks, dams, bridge piers, and abutments, forts and other structures on land.

The object of the present invention is to provide an improved method for the construction of such polyangular structures whereby not only may the reenforcement be erected in level layers by unskilled workmen and the concrete applied with a minimum expenditure of time and labour thereby speeding up and reducing the cost of construction but the whole structure be strengthened and stiffened throughout both during construction and after completion thereby enabling it better to withstand internally and externally considerable stresses and strains whether concentrated or diffused vertically horizontally or diagonally or superimposed.

According to the present invention the reenforced concrete structure is composed of a plurality of polyangular cells containing metallic reenforcement composed of plates—which are preferably reticulated—shaped to such a form that while they will pack compactly for shipment and storage without loss of space or liability to become deformed under load they will when erected fit exactly and without any cutting or dressing by hand into proper position for joining together laterally and vertically and the surfaces of said plates when assembled will be vertical one above the other so that when the concrete is applied as hereinafter explained there shall be the same thickness of protecting concrete on both sides of the metallic reenforcement.

In a co-pending application for patent of even date herewith and numbered 637,865 I have described the construction of the metallic reenforcing sheets or plates in detail and while for convenience of description these plates or sheets are illustrated and to some extent described herein they do not per se form part of the present invention which is concerned with the method of erecting reenforced concrete structures of the character hereinbefore referred to.

In the construction of a reenforced concrete structure composed of hexagonal cells I arrange sheets of metallic reenforcement the vertical edges of which are curved or angled as described in my co-pending specification so that considering one corner of an hexagonal cell there will be three sheets of metallic reenforcement meeting and overlapping each other each sheet of reenforcement being joined by bolting or otherwise to both of its neighbours the overlapping and double bolting giving columnar stiffness and strength at the junction of the hexagonal cells where it is most required. The dishing or stamping of the sheets of metallic reenforcement making each one the exact counterpart of all the others allows two, three or more sheets to be laid together wherever increase in the strength of the reenforcement is required.

The space between the curved or angled ends of the sheets of reenforcement may enclose one or more vertical bars or pipes which may serve the functions of a guide for the speedy and accurate setting of superimposed tiers of reenforcement sheets and when said bars are frictionally gripped by the tightening of the bolts which connect the reenforcing sheets together adds to the vertical strength of the mass. The guide rods may carry plates or angle clips adapted to slide or be clipped upon them to connect the curved or angled ends of the sheets of reenforcement before being bolted up or otherwise fastened together or the angle clips may be used without guides and removed for further use after the curved ends have been permanently bolted up or otherwise fastened together. The three legs of the clips are preferably of different lengths so that after the first reenforcement sheet has been put in its place contact with it is not lost when the clip is lifted to admit the second sheet. When it is again lifted to admit the third sheet contact is still retained with the first and second sheets.

By the means just described there may be erected a substantially rigid metallic skeleton of the intended structure—or as much of it as may be required at a time—composed of hexagonal shaped cells of appropriate height and sufficiently rigid and strong to carry on their edges platforms and gangways for conveying men and material and for the erection of light cranes poles for electric cables machinery stores of material and the like. By enclosing said skeleton by means of suitable shuttering or mold walls concrete may be poured so as to embed the metallic reenforcement and so cast one or more tiers of hexagonal compartments or cells practically in one homogeneous mass the wet concrete being preferably vibrated by suitable vibrating devices such as pneumatic hammers in the known manner whereby the particles of aggregate and cement are compacted and water and air driven out thereby considerably augmenting the strength of the concrete and rendering it substantially non-porous and water-proof.

When it is desired to limit the number of complete cells in which the poured concrete is to be vibrated at the same time, suitable blocks are inserted in the channels between the shuttering to stop the flow of concrete. These blocks may be made of metallic sheets similar to the sheets employed in the erection of the metallic skeleton but with concrete precast upon them so that they may be built into the metallic skeleton of the reenforcement one above the other in order that a complete vertical partition will be formed between adjoining groups of cells without any interference to their subsequent shuttering arrangement.

As it is one of the properties of vibration that a clean joint between old and new concrete is perfectly homogeneous the blocks become one and homogeneous with the poured concrete on either side of them.

Owing to the greatly added stiffness of the metallic reenforcement thus erected by itself without other support by reason of the complete joining and fastening together of every sheet to juxtaposed sheets laterally at each of its ends and to the sheets above and below along its horizontal edges each coil is in a position to resist without permanent deformation of its sheets considerable internal stresses outwards across its angles or outwards across its flats if such stresses are counterpoised by identical outward stresses across the flats of the adjoining cells which stresses may again be diverted if advantageous so as to cross the angles of surrounding cells. These features may thus be taken advantage of to apply shuttering in a much speedier manner than formerly and to apply pressure to the shuttering to more effectually prevent leakage of the poured concrete when under vibration.

In order that the invention may be readily understood and carried into practice by those familiar with the art to which it appertains I will now proceed to describe the same in detail with reference to the accompanying drawings it being first understood that the reenforcing elements of Figures 1 to 3 are shown as composed of metallic sheets or plates for convenience of illustration and description but that in practice I prefer to employ reticulated metal so that when the concrete is applied it may pass through the reticulations and embed the reenforcement in its mass.

Fig. 1 illustrates one form of metallic reenforcing element.

Figs. 2 and 3 illustrate modified forms thereof.

Fig. 4 is a perspective view of portions of three reenforcing elements with the adjacent ends thereof overlapping.

Fig. 5 shows one method of securing the overlapping ends of the reenforcing elements together.

Fig. 6 is a view showing a portion of one form of shuttering.

Fig. 7 illustrates a portion of the same form of shuttering as contracted for lowering into or lifting from a cell as hereinafter more particularly described.

Fig. 8 shows one constructional form of clip for holding the overlapping ends of reenforcement together.

Figure 18:
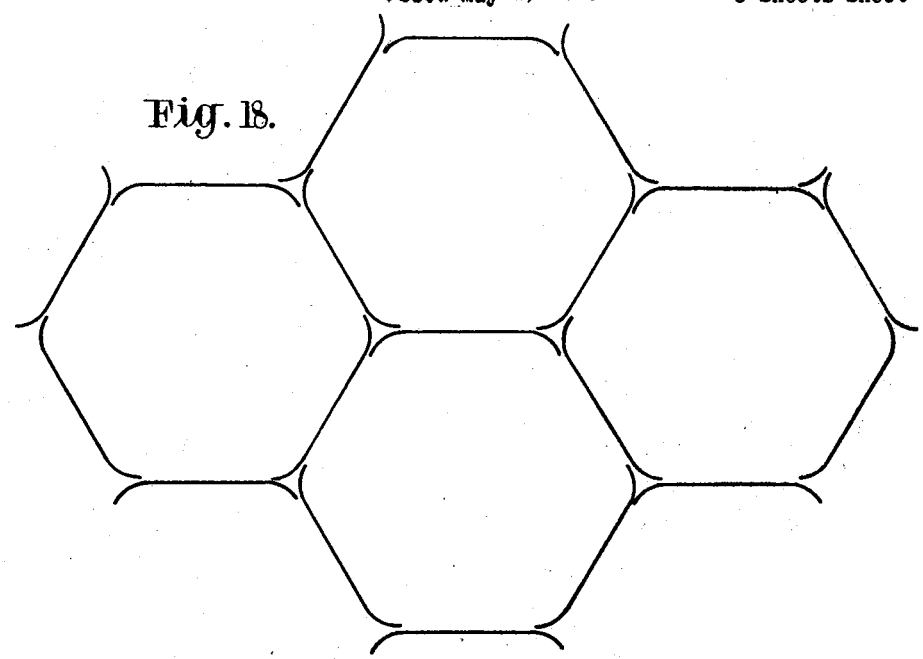
Fig. 18 is a plan of a portion of an hexagonal metallic skeleton showing the reenforcing elements of Figure 1 in position.
Figure 19:
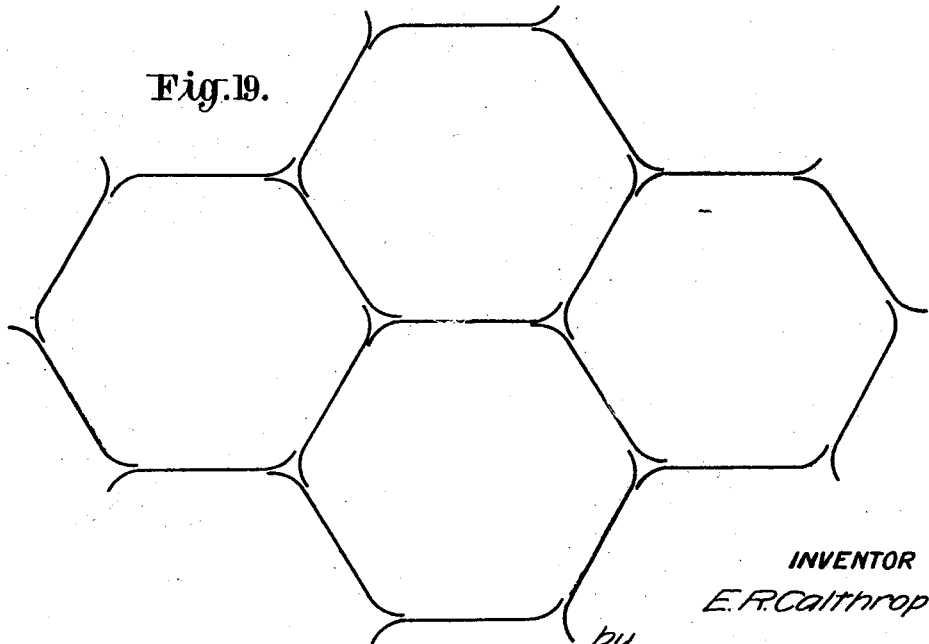
Figure 19 is a similar view of the reenforcing elements of Figures 2 and 3.

In the erection of a reenforced concrete hexagonal cellular structure according to the present invention the metallic reenforcement elements $a$ are built up to the desired height to produce the metallic skeleton of Figures 18 and 19 as fully described in the specification of my aforesaid co-pending application for a patent and the space between the curved vertical edges $b$ of the elements may enclose one or more vertical bars or pipes $c$ (see Fig. 5) which will not only serve as a guide for the accurate and speedy positioning of the higher tiers of reenforcing elements but will when gripped by the tightening of the bolts $d$ which serve to secure the elements $a$ together greatly increase the strength of the joint and also of the whole structure. Referring now to Figure 8 this figure shows a form of clip designated as a whole by the reference letter $e$ which is adapted to hold the three edges of the reenforcing elements in position. This clip is formed with three legs $f$, $g$ and $h$ of different lengths so that when the first element $a$ is placed in position contact therewith will be retained when the clip is raised to admit the second sheet and when raised again to admit the third sheet contact is still retained with the first and second sheets. The clips can of course be used without the bars $c$ as guides.

The metallic elements when placed in position and secured together in the manner described will form a skeleton structure—or as much of it as may be required at a time—which is sufficiently strong to support platforms, gangways or the like for cranes, conveying of men and material, poles for electric cables, compressors for vibrating machinery, stores and the like.

The shuttering is then placed in position and concrete poured to embed the reenforcement and so cast one or more tiers of hexagonal cells practically in one homogeneous mass.

The shuttering I prefer to employ is shown in Figs. 6, 7, 9 and 10 and comprises side pieces $i$ and corner portions $k$. Instead of bolting the shuttering through the reenforcement which takes a considerable time in adjustment and may be accompanied with a great loss of bolts and nuts I prefer to employ distance pieces $m$ which abut against the reenforcement and maintain the shuttering at the required distance from the reenforcement. These distance pieces besides performing this function also serve to transmit pressure outwardly from the pressure means (which I shall presently proceed to describe) in one cell to the counterpoising pressure of the pressure means outwardly in an adjoining cell. The holes in the concrete made by said distance pieces may if desired be filled up with cement but preferably in order to prevent the holes from penetrating through the walls from one cell to another, the distance pieces $m$ are set out of line with one another or staggered but sufficiently close together to permit transmission of pressure through the reenforcement plate without bending it. I have shown at the left of Fig. 9 the distance pieces opposite one another and at the right the distance pieces set out of line.

The corner portions $k$ of the shuttering are placed in the corners of the cells formed by the curved ends of the reenforcing elements and if desired suitable packing may be provided to make a tight joint.

When all the side and angle shutters $i$ and $k$ have been placed in position within a cell an expansion ring $n$ is lowered into position said ring having a number of screws $o$ projecting from its periphery at appropriate distances apart and adapted to engage the corner portions $k$ and the side portions $i$ of the shuttering. A second ring $n'$ (Fig. 10) and a third or more if desired may be placed higher up and the screws caused to engage the shuttering so that all the shuttering in the interior of that cell will be held firmly in position during the pouring vibrating and setting of the concrete every stress in one cell being counter-balanced by an opposing stress in adjacent cells.

By this means a cellular structure of reenforced concrete may be produced of any desired size the concrete being vibrated in ratio to the mass poured together at any one time by known means before it becomes set so as to consolidate it and drive out air and water thus rendering it non-porous and waterproof and of greatly augmented strength and with the use of less cement. In the case of any small local leakage during vibration the further extension of the screws $o$ will stop it.

Instead of employing expansion rings such as just described I may use expanding jacks placed in the centres of the narrow shutters near their base and the jaws of the jacks forced outwards. It may here be stated that in molds for chimney construction it has been proposed to employ inner and outer concentric rings each of which was provided with screws projecting from the periphery thereof and adapted to retain the segments of the mold in position whilst concrete or other plastic material was being poured into said mold.

The several portions of the shuttering that is to say the side shutters $i$ and the corner portions $k$ are connected together by means of curved pivoted links $q$ and the shuttering as a whole and the expansion ring $n$ are connected by ropes or chains $p$ so that all may be lowered as a whole into a cell by a winch or crane thus saving much time in operation and preventing dropping and recovering of loose shutters and tools from the bottom of a deep cell.

Figure 9:
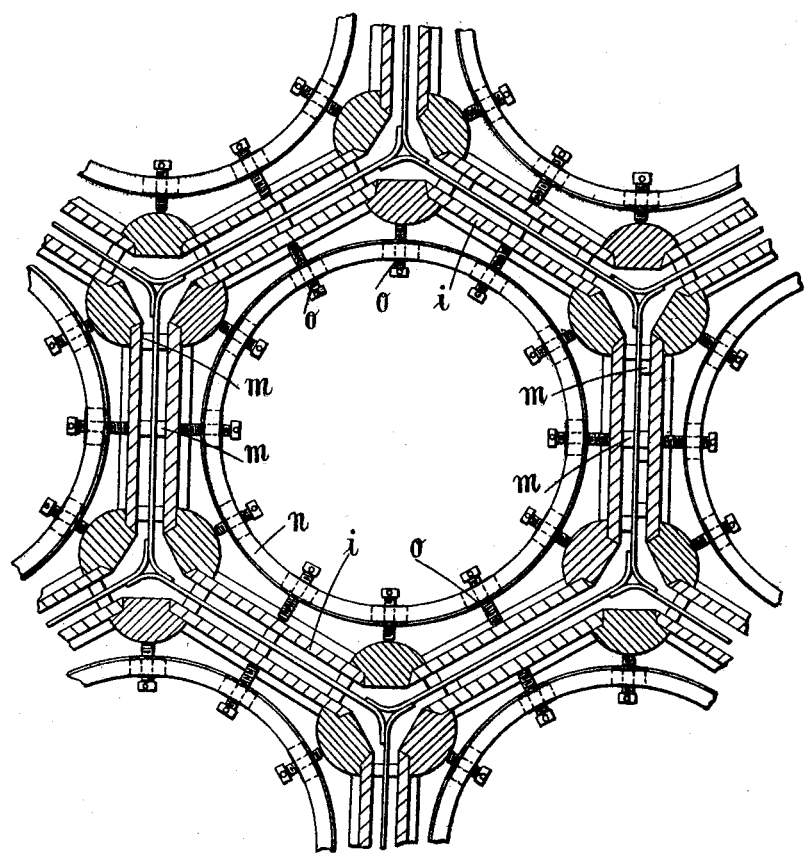
Fig. 9 shows a sectional plan of one complete cell with the shuttering in position and portions of adjoining cells.
Figure 10:
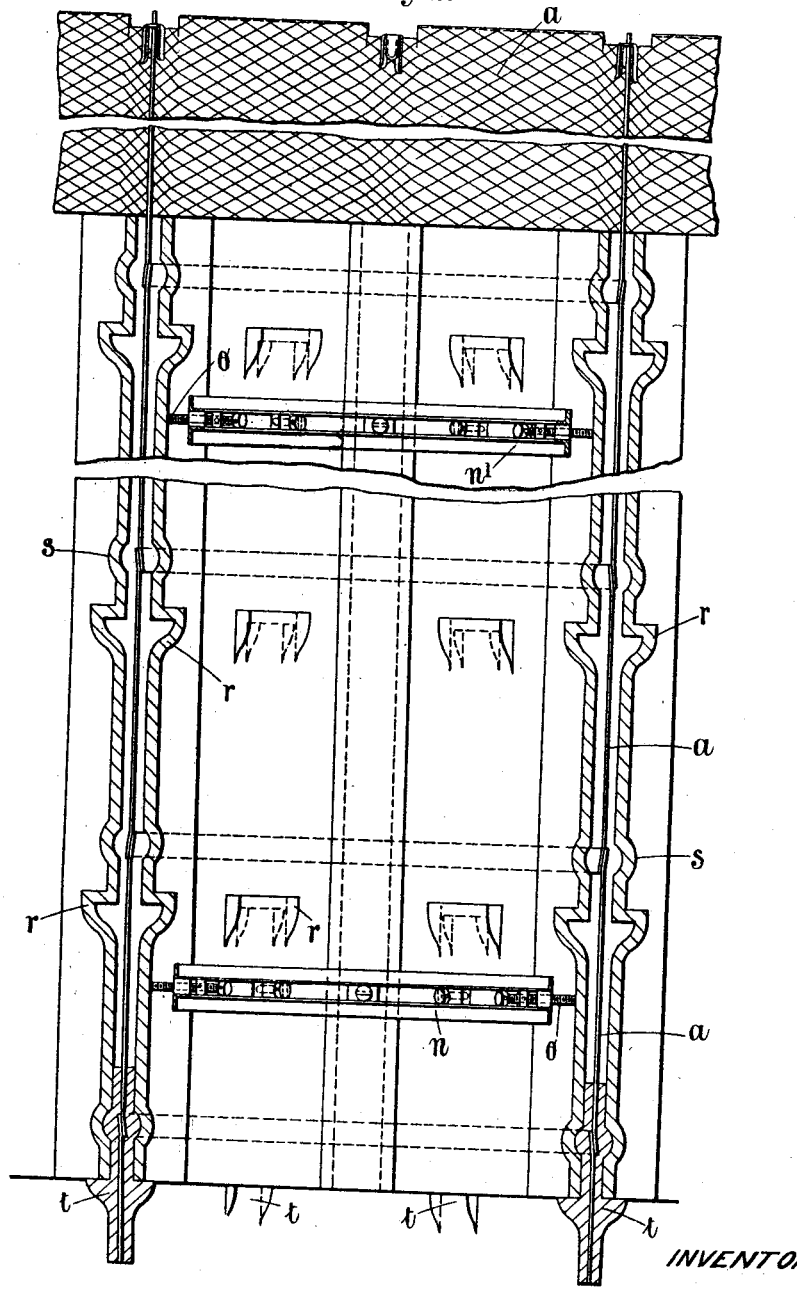
Fig. 10 illustrates a section of one hexagonal cell showing shuttering in position and a portion of the metallic reenforcement projecting at the top.

Referring now to Figure 10 it will be seen that the shuttering is formed with projecting "boxes" r and protuberances s so that when the concrete has been cast around the metallic reenforcement a steps t will be formed as shown at the bottom of this figure upon which the shuttering for super-imposed tiers may rest thereby ensuring accurate positioning and registration of the super-imposed shuttering. The protuberances s are so arranged that the horizontal joints between the reenforcing elements a will be embedded in an additional thickness of concrete as will be readily understood from an inspection of the figure in question.

After pouring vibration and setting of the concrete is complete the linked shuttering may be raised together by the winch or crane to the desired height and placed on any of the steps t above.

If desired air or water pressure or electricity may be employed to exert the necessary pressure simultaneously on the shuttering of all the cells of a section in which concrete is to be poured.

Any number of sets of shutters and expansion means may if desired be raised together by means of suitable framing by hydraulic or other suitable means.

Figure 11:
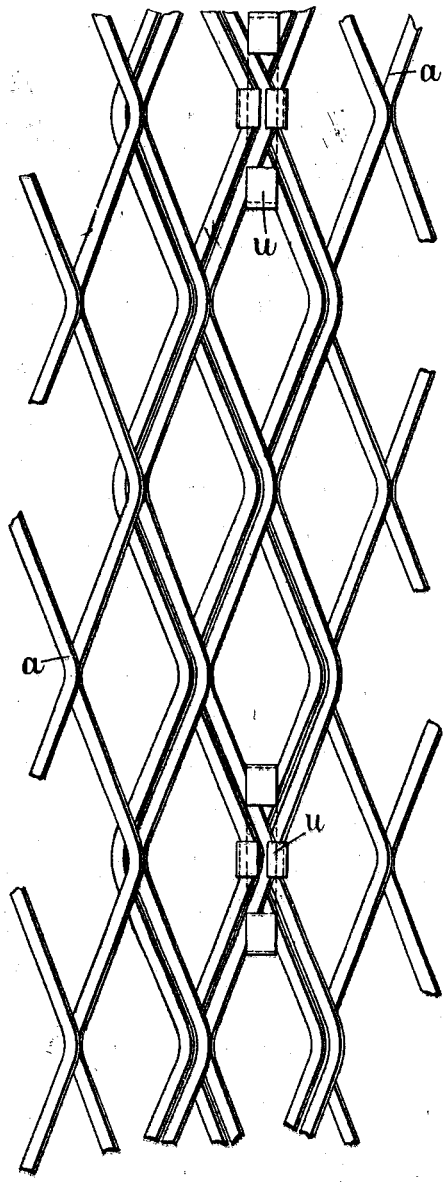
Fig. 11 is an elevation of portions of two reenforcing elements of expanded metal and shown as being overlapped and clipped together to resist tensional stresses.
Figure 12:
Fig. 12 is an edge view of Figure 11.

As already stated the reenforcing elements are preferably of reticulated metal and in Figures 11 and 12 I have shown the overlapping and securing together of two elements by means of metal clips u each of which are provided with four legs which are bent so as to embrace and secure the two overlapped portions so that one element will fit snugly into another at the joint.

Figure 13:
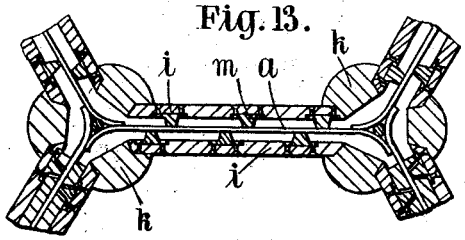
Figures 13 and 14 are detail views hereinafter more particularly described.
Figure 14:
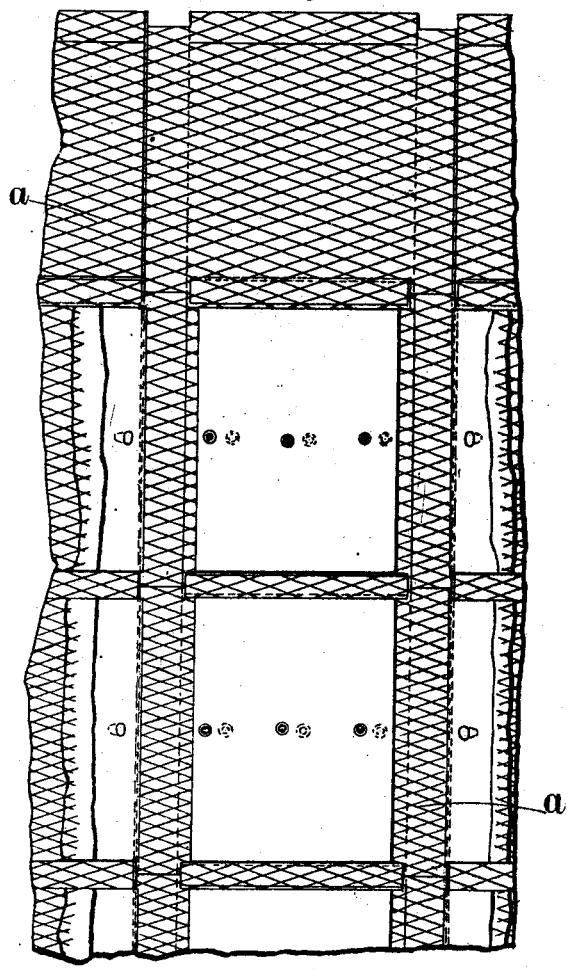
Figure 15:
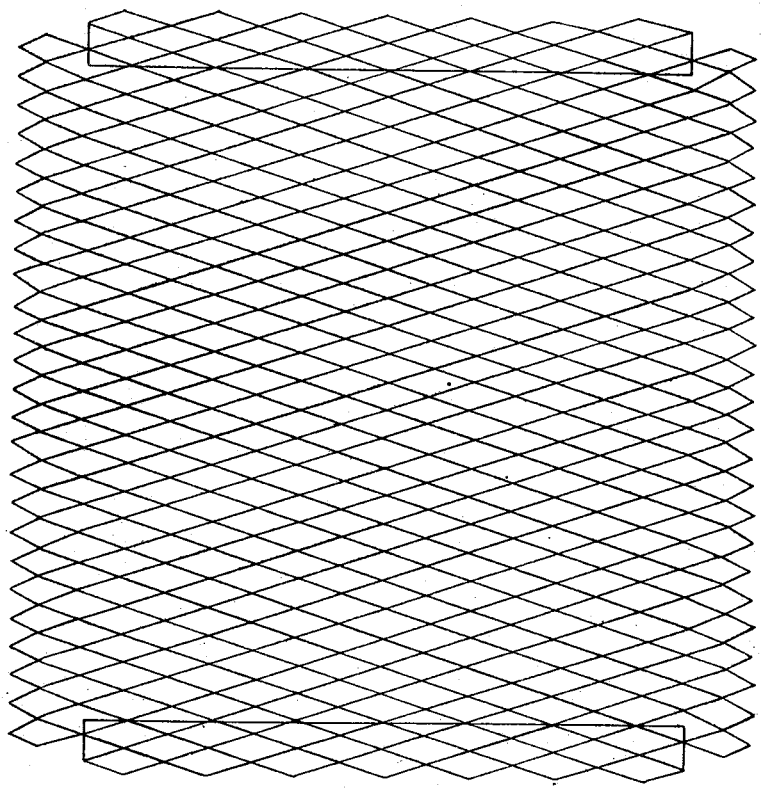
Fig. 15 is a view of an expanded metal reenforcing element.
Figure 17:
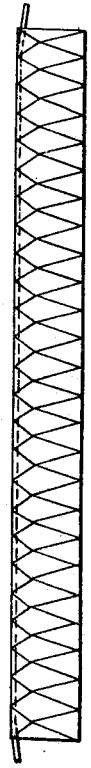
Figures 16 and 17 are a front elevation and side elevation respectively thereof.
Figure 16:
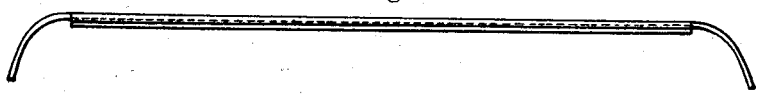

It is of course necessary when the structure under erection is of the desired area that means must be provided for stopping the flow of concrete at the corners of the cells situated at the boundary of the intended structure and in other cases it may be desirable to prevent the concrete flowing from one cell to another and in Figures 13 and 14 I have illustrated how this may be effected.

In this arrangement pre-cast concrete slabs embedding the reenforcing elements a are arranged in position as shown at the lower part of Figure 13 whereby vertical walls are formed which prevents the concrete when poured into the corners of the cell, or into an adjacent cell from flowing.

Figure 20:
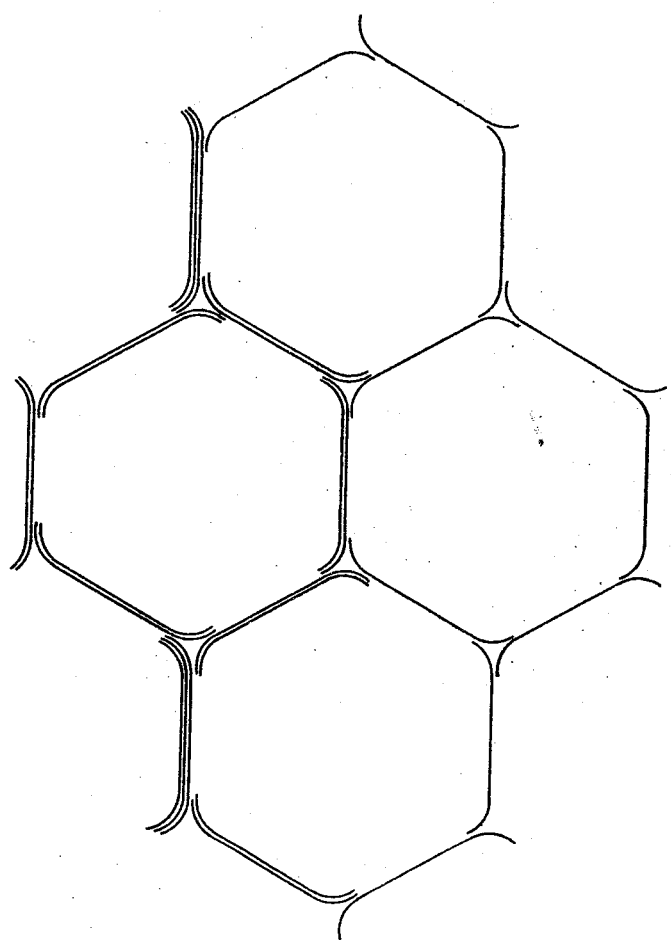
Fig. 20 is a similar view to the two preceding figures but illustrating how the reenforcing elements may be duplicated or triplicated at the places where additional strength is required.

One of the particular advantages of my improved method of erecting cellular structures by means of a rigidly connected skeleton of reenforcement is that the next upper tier of concrete can be poured and vibrated much sooner than by any of the methods heretofore known thus greatly increasing the speed of construction for it will readily be perceived that due to the support afforded by the shuttering and the holding of the shuttering by the steps t the whole weight is transmitted to well matured concrete below. The work may be further speeded up by the introduction of heated dry air into the cells to assist in the evaporation of moisture in the concrete.

Where it is required to reenforce the flooring of the first tier cells made for a floating structure for example or for decking at any desired height metallic or other floor plates may be employed either in single sheets or triple sheets as is more particularly described in my aforesaid co-pending specification.

Where it is desired that the cells should possess additional strength the reenforcing elements may be duplicated or triplicated as is illustrated in the diagrammatic view of Figure 20 as the reenforcing elements being standardized for any particular structure lend themselves readily to such an arrangement without it being necessary to cut or otherwise treat them in order that they may fit the positions designed for them.

I regard as within the scope of my invention the erection of cellular structures wherein the cells are composed of pre-cast reenforced concrete slabs and the junctions cast in situ the metallic reenforcement being similar in all respects to those hereinbefore described and the spaces between the precast slabs which will exist vertically and horizontally being filled up by means of concrete which during vibration will become homogeneously assimilated with the precast slabs forming the walls of the cells.

What I claim is:—

1. A method of erecting cellular structures of reenforced concrete which consists in first erecting a skeleton of metallic reenforcement composed of sheets the vertical edges of which are angled to overlap, applying shuttering to both sides of said reenforcing sheets, applying means to retain the shuttering in position during the casting of the concrete and simultaneously equalizing the pressure throughout all the cells for the time being in course of construction and casting concrete between the shuttering to embed the reenforcement.

2. A method of erecting cellular structures of reenforced concrete which consists in first erecting a skeleton of metallic reenforcement composed of sheets the vertical edges of which are angled to overlap, applying shuttering to both sides of said reenforcing sheets said shuttering having means thereon whereby steps and protuberances are formed on the walls of the cells during the casting of the concrete, applying means to retain the shuttering in position during the casting of the concrete and simultaneously equalizing the pressure throughout all the cells for the time being in course of construction and casting concrete between the shuttering to embed the reenforcement.

3. A method of erecting cellular structures of reenforced concrete which consists in first erecting a skeleton of metallic reenforcement composed of sheets the vertical edges of which are angled to overlap, applying shuttering composed of side pieces and corner pieces in both sides of said reenforcing sheets, applying means to retain the shuttering in position during the casting of the concrete and simultaneously equalizing the pressure throughout all the cells for the time being in course of construction and casting concrete between the shuttering to embed the reenforcement the shuttering and the means for exerting pressure thereupon being connected together so that they may be introduced into or removed from a cell as a whole.

4. A method of erecting cellular structures of reenforced concrete which consists in first erecting a skeleton of metallic reenforcements composed of sheets the vertical edges of which are angled to overlap, applying shuttering to both sides of said reenforcing sheets, applying rings having screw bolts mounted thereon to the shuttering and simultaneously equalizing the pressure throughout all the cells for the time being in course of construction and casting concrete between the shuttering to embed the reenforcement.

EVERARD RICHARD CALTHROP.